United States Patent [19]

Sugawa

[11] 4,312,432

[45] Jan. 26, 1982

[54] MULTIPLE FUNCTION ACTUATOR

[76] Inventor: Hiroshi Sugawa, 2-11, 2-chome, Minami-Nagasaki, Toshima-ku, Tokyo, Japan

[21] Appl. No.: 51,351

[22] Filed: Jun. 25, 1979

Foreign Application Priority Data

[30] Jun. 27, 1978 [JP] Japan ............................ 53-77834

[51] Int. Cl.³ ............................................ B60K 41/26

[52] U.S. Cl. .................................. 192/4 R; 74/99 R; 74/110; 74/89.22

[58] Field of Search ................... 192/4 R, 4 C, 4 B, 7; 74/8 A

[56] References Cited

U.S. PATENT DOCUMENTS

| | | | |
|---|---|---|---|
| 945,034 | 1/1910 | Gooch | 192/4 R |
| 1,909,579 | 5/1933 | Gerlinger | 192/4 R |

*Primary Examiner*—H. Hampton Hunter
*Attorney, Agent, or Firm*—David G. Alexander

[57] ABSTRACT

An actuator operable to serve concurrently or selectively as a rotary actuator and/or as a linear motion actuator is provided, which comprises a piston-cylinder unit (20, 21), a pair of substantially parallel output shafts (22, 22) having axes substantially perpendicular to the central axis of the cylinder (20) and respectively including confined portions sealingly enclosed in the fluid-tight chamber defined by the cylinder and exposed portions projecting via seal means (45) out of said fluid-tight chamber, a substantially non-extensible and substantially flexible shut-in power transmission element (26) fixedly connected to the piston of said piston-cylinder unit at the substantial center thereof and having ends fixedly connected relative to said confined portions of said pair of substantially parallel output shafts (22, 22), and a shut-out power transmission element (27) having ends fixedly connected relative to said exposed portions of said pair of substantially parallel output shafts (22, 22), said shut-in and shut-out power transmission elements (26, 27) in combination with said paired output shafts (22, 22) being operatively associated such that they constitute a complete pulley system to be driven responsive to the reciprocal movement of said piston (21) to transmit linear motion and/or rotational actuating powers.

11 Claims, 12 Drawing Figures

MULTIPLE FUNCTION ACTUATOR

BACKGROUND OF THE INVENTION

1. Field of the Invention

The present invention relates to an actuator for converting the fluid pressure to the mechanical power of action, and more particularly it relates to a novel actuator which can be operated to serve concurrently or selectively as a rotary actuator and/or as a linear motion actuator.

2. Prior Art

Recently, actuators driven by pressurized fluids have been widely used as important mechanisms in automation systems, semi-automatic machines and various lavour-saving systems. Such actuators conventionally produced and commercially supplied for use may be classified into rotary actuators and linear motion actuators. However, an actuator which can be operated to serve concurrently or selectively as a rotary actuator and/or as a linear motion actuator has not yet been practically available by the prior art technique.

In the prior art, difficulty in fluid-tightly sealing the portion at which the rotational or rocking motion is picked out of the hydraulic or pneumatic cylinder, hinders the realization or a rotary actuator which may be highly efficiently and reliably operated. None of the conventionally available rotary actuators could avoid the disadvantageous leakage of the high pressure fluid without causing pressure loss due to friction at the sealing portion.

On the other hand, the prior art linear motion actuator exerting high power output is essentially composed of a piston and a piston rod integrally secured to said piston, so that, in installation of such actuator, a considerably large space area which is normally vacant when the actuator is not operated is necessitated in the longitudinal direction thereof for accommodating the stroke length of the outwardly projecting piston rod in addition to the length of the long cylinder to result in redundant increase of the space area necessary for accommodating the entire actuator mechanism. A further disadvantage of the prior art linear motion actuator is that a cooperative actuator system including a plurality of actuators cannot be assembled without using a balancing device for registering or adjusting the timing or operational positions of the plurality of actuators precisely. Without such delicate and expensive balancer, the prior art linear motion actuators cannot be combined in a multiple function actuator system. The final and most inconvenient disadvantage of the prior art linear motion actuator is that it is merely operated in a single mode function.

Under these circumstances, there is an increasing demand for an actuator which may be operated reliably at high efficiency with minimal pressure loss due to friction while being caused by no appreciable leakage of the high pressure fluid.

OBJECT AND SUMMARY OF THE INVENTION

It is, therefore, a principal object of the invention to provide a novel actuator which is compact and simple in construction and yet can be operated to serve concurrently or selectively as a rotary actuator and/or as a linear motion actuator.

Another object of the invention is to provide an actuator which may be operated reliably at high efficiency with minimal pressure loss due to friction while being caused by no appreciable leakage of the high pressure fluid.

A further object of the invention is to provide an actuator suited for actuating one or more articulated arms or link mechanisms. In the art of the articulated hydraulic mechanism employed in an industrial robot or construction machines such as an excavator, remarkable progress would be realized if provided with simple and inexpensive control means for controlling complicated operations of the mechanism. Provision of an actuator employable for such control means is, therefore, one of the important objects of the invention.

Yet a further object of the invention is to provide an actuator which may be used as a servo motor required to have the precise positioning function.

Another object of the present invention is to provide an actuator for actuating a pair of adjacently disposed rotatable loading shafts simultaneously or at an appropriate delayed time interval, thereby, for instance, to open and close two adjacently disposed valves.

A further object of the invention is to provide an actuator suited to be incorporated in a system for actuating a pair of spaced rocking arms in synchronism with each other.

A further object of the invention is to provide a linear motion actuator having an operative length or working distance considerably longer than the stroke length of the piston thereof.

The above and other objects and advantages of the invention has been materialized, according to the present invention, by the provision of an actuator comprising a piston-cylinder unit, a pair of substantially parallel output shafts having axes substantially perpendicular to the central axis of the cylinder of said piston-cylinder unit and respectively including confined portions sealingly enclosed in the fluid-tight chamber defined by said cylinder and exposed portions projecting via seal means out of said fluid-tight chamber, a substantially non-extensible and substantially flexible shut-in power transmission element fixedly connected to the piston of said piston-cylinder unit at the substantial center thereof and having ends fixedly connected relative to said confined portion of said pair of substantially parallel output shafts, and a shut-out power transmission element having ends fixedly connected relative to said exposed portions of said pair of substantially parallel output shafts, said shut-in and shut-out power transmission elements in combination with said pair of output shafts being operatively associated such that they constitute a complete pulley system to be driven responsive to the reciprocal movement of said piston thereby to transmit linear motion and rotational actuating powers concurrently.

The present invention will be more fully understood from the detailed description of the presently preferred embodiments thereof with reference to the accompanying drawings.

BRIEF DESCRIPTION OF THE DRAWINGS

FIG. 8 is a schematic view of a robot wherein an embodiment of the invention is incorporated as the actuator;

DESCRIPTION OF THE INVENTION

Figure 1:
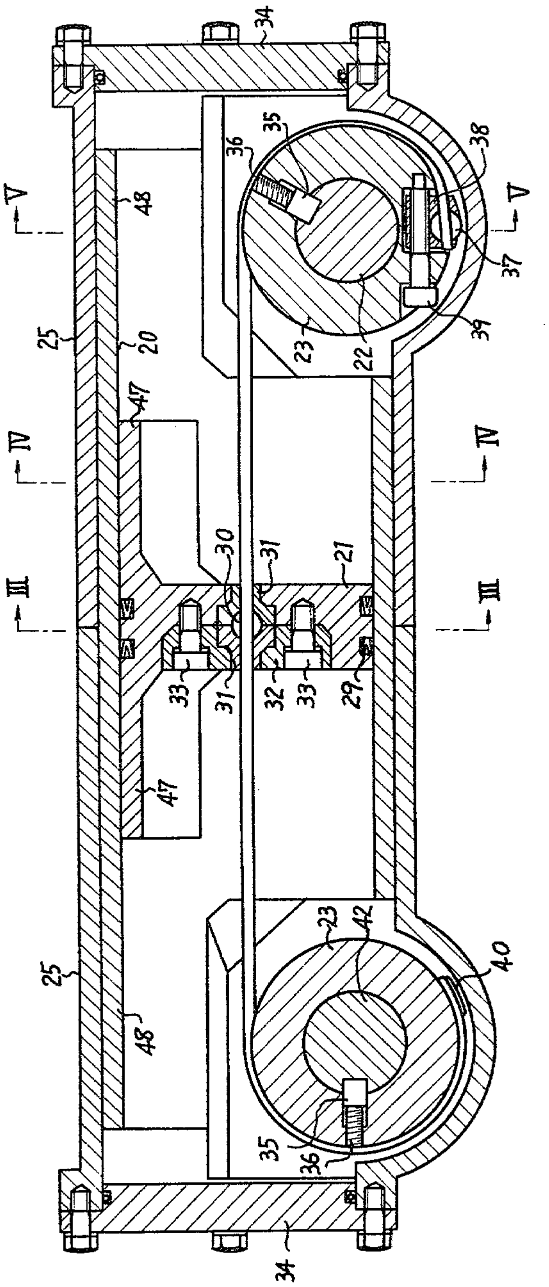
FIG. 1 is a longitudinal section of an embodiment of the invention taken diametrically of the substantially cylindrical fluid-tight housing.

To summarize, the inventive feature of the present invention resides in that the pulley belt means ordinarily stretched over a pair of opposed pulley block means to form a closed and endless loop is divided into shut-in and shut-out power transmission elements, the shut-in power transmission element constituting the active or positive run while being sealingly enclosed in the fluid-tight chamber for receiving the driving pressurized fluid, whereas the shut-out power transmission element constituting the reactive or return run of the pulley belt means while disposed out of the fluid-tightly closed chamber.

The ends of the shut-in and shut-out power transmission elements are fixedly connected relative to the same pair of output shafts for being wound-up therearound and wound-off therefrom directly or indirectly through larger diameter take-up means in response to the reciprocal movement of the piston, whereby rotational actuating powers may be picked-up from both of the paired output shafts. When certain power pick-up member is secured to the shut-out power transmission element, a linear actuating power may be picked-up in addition to the rotational actuating powers.

Furthermore, if an additional shut-out power transmission element is mounted to the ends of the paired output shafts, i.e. when each of the paired output shaft is allowed to extend through two axially sealing means out of the fluid-tightly closed chamber and two shut-out power transmission elements are mounted respectively to the opposed extensions of each shaft projecting past the said two seal means, the linear actuating power may be doubly picked up. If the thus mounted two shut-out power transmission elements are provided with one for each of linear motion pick-up means such that one of them is moved in the same direction as the moving direction of the piston whereas the other is moved in the direction reverse to the moving direction of the piston, the maximum relative displacement between each of the linear motion pick-up means is doubled as compared to the length of the piston stroke. Thus, according to the present invention, a linear motion actuator having an operative length or working distance which is two times as long as the stroke length can be easily produced without resulting appreciable increase in dimensions and cost.

The shut-in power transmission element may be continuous and integral member such as a wire rope provided with a fixing metal bead as shown in the first embodiment hereinafter illustrated; however, in the sense of dinamics, it is sub-divided into two portions, each being stretched between the point fixedly connected to the one side face of the piston and the point fixedly connected either one of the output shafts. Strictly speaking, since the flexible power transmission element is effective only to transmit the pulling force, the portion of either one of the thus sub-divided shut-in power transmission elements extending from the piston face applied with the force of the pressurized fluid to the tangental contact point on the take-up means, this portion being referred to as the first shut-in power transmission element hereinafter in the specification and claims, solely constitutes the active or positive run to transmit the pulling force. This pulling force is converted to a turning force to actuate the first output shaft by applying a force on the confined portion thereof enclosed in the pressurized compartment of the fluid-tight cylinder, since the end other than that fixedly connected to the piston of the first shut-in power transmission element constituting the active or positive run is fixedly connected relative to the first output shaft. This turning force applied to the first output shaft is again converted to a pulling force and transmitted through the shut-out power transmission element to actuate the second or opposed output shaft of the paired output shafts. Upon actuation of the second output shaft, the remaining portion of the sub-divided shut-in power transmission element, or the second shut-in power transmission element as will be referred to hereinafter throughout in the specification and claims, is pulled by the turning force of the second shaft to be wound around the take-up means mounted on that shaft. Under the influence of the thus created pulling force, or in some sense thus preserved and transmitted pulling force, the second shut-in power transmission element is tautly stretched between the tangental contact point on the take-up means to the piston face facing the de-pressurized or discharged compartment of the cylinder to complete a pulley system.

As will be clearly understood from the foregoing description that a novel and patentably distinctive pulley system is provided by and skillfully incorporated in the actuator of the present invention, said pulley system comprising a first shut-in power transmission element enclosed in the pressurized compartment of the piston-cylinder unit and having one end fixedly connected to the one face of the piston of said piston-cylinder unit, a first output shaft including a confined portion sealingly enclosed in said pressurized compartment of said piston-cylinder unit and fixedly connected relatively with the other end of said first shut-in power transmission element, said first output shaft further including an exposed portion projecting via seal means out of said pressurized compartment, a shut-out power transmission element having one end fixedly connected relative to said first output shaft, a second output shaft substantially parallel to said first output shaft and including an exposed portion extending out of the de-pressurized compartment of said piston-cylinder unit for being fixedly connected relatively with the other end of said shut-out power transmission element, said second output shaft further including a confined portion sealingly enclosed in said de-pressurized compartment, and a second shut-in power transmission element enclosed in said de-pressurized compartment and having one end fixedly connected relative to said confined portion of said second output shaft and the other end fixedly connected to the other face of said piston. In brief, said first and second shut-in power transmission elements, said first and second output shafts and said shut-out power transmission element constitute in combination a complete pulley system.

It should be noted here that the wordings "first", "second", "the one" and "the other" appearing in the foregoing and other parts of the specification are used for simplify the descriptions and to facilitate the understanding of the invention, and such wordings should not be construed in a limiting sense but as those used for reasons of expediency for describing a single stroke operation.

As has been described above and will be defined in the claims, the shut-in power transmission element shall be made of a substantially non-extensible and substantially flexible material, practical examples of such material including a wire rope or pulley belt to be would around a take-up draum, a chain or timing belt to be meshed with a sprocket mounted on the output shaft and a leaf chain in combination with pulley means.

On the other hand, the shut-out power transmission element is not essentially made of a substantially nonextensible and substantially flexible material, and thus the practically available materials therefor include, for example, a rack meshing with a pinion mounted on the output shaft in addition to those referred to above for the shut-in power transmission element. However, substantially non-extensible and substantially flexible materials are preferred for producing an actuator which is reliable in operation and yet simple and compact in construction. Particularly, in order to preclude the delicate adjusting procedure for compensating and balancing the pulling forces existing in the shut-in and shut-out power transmission elements, it is recommended that the both elements be made of the same meterial.

According to a further aspect of the invention, the shut-in power transmission element and the shut-out power transmission element are sealingly separated from one another by simple axial sealing means. Any of the known axial sealing means may be used for this purpose. The sealing area which may cause pressure loss due to friction is thus minimized.

The present invention will now be described in detail with reference to a few embodiments thereof and a few appliances incorporated with the actuators according to the invention.

FIGS. 1 to 5 show an embodiment of the invention which is a pneumatically driven actuator operated within a working angle of about 240°. Firstly, referring to FIG. 1 showing the longitudinal section of the embodiment, a piston 21 substantially T-shaped in section is provided with O-ring packings 29 sealingly separating the air-tight cylinder 20 into two compartments, and may be slidably moved in the right and left directions, along the central axis of the cylinder 20 under the action of the pressurized air charged and discharged through the inlet and outlet ports (not shown). The piston 21 has somewhat anormalous contour with a relatively thin cylindrical body and an overhanging crescent portion 47. The reciprocal movement of the piston 21, in the right and left directions as viewed in FIG. 1, is transmitted through a shut-in power transmission element or wire ropes 26 provided with fixing metal beads 30 secured generally at the center of the wire ropes 26 which are tautly stretched between paired output shafts 23, 23 while being applied with some stretching forces. Each of the wire rope 26 is fixedly secured to the piston 21 by fixing the bead 30 by means of anchoring member 31, 31, a fitting plate 32 and a stud 33. In the illustrated embodiment, the cylinder 20 is fluid-tightly separated from the ambient atmosphere by a housing 25 which may be composed of two symmetrical members adjoined together at their peripheries along the line III—III in FIG. 1 by means of four bolt-and-nut pairs 42 for fluid-tightly clamping generally square shaped flanges 44, 44 provided around the outer peripheries of the symmetrical members (see FIGS. 2 and 3). The free ends of the thus composed housing 25 are fluid-tightly closed by lid members 34, 34 provided respectively with fluid inlet-and-outlet ports (not shown). Also housed in the housing 25 are confined portions of opposingly disposed pair of output shafts 22, 22 and pulley blocks 23, 23 mounted on the shafts 22, 22 for winding-up or winding-off the ropes 26 in response to the reciprocal movement of the piston 21. For this purpose, each of the ropes 26 is anchored in such a manner that the left end as viewed in FIG. 1 is provided with a loop which is hooked on a projection 40 of the left pulley block 23 while the other end (right-and end) is provided with a metal bead 37 which is anchored by a rope end fixing member 38. The position of the member 38 may be adjusted by a adjusting bolt 39 to control the stretching force preliminarily applied on each rope 26 at a desired strength. The pulley blocks 23, 23 are fixedly secured to the shafts 22, 22 by keys 35, 35 and key set screws 36, 36.

Figure 2:
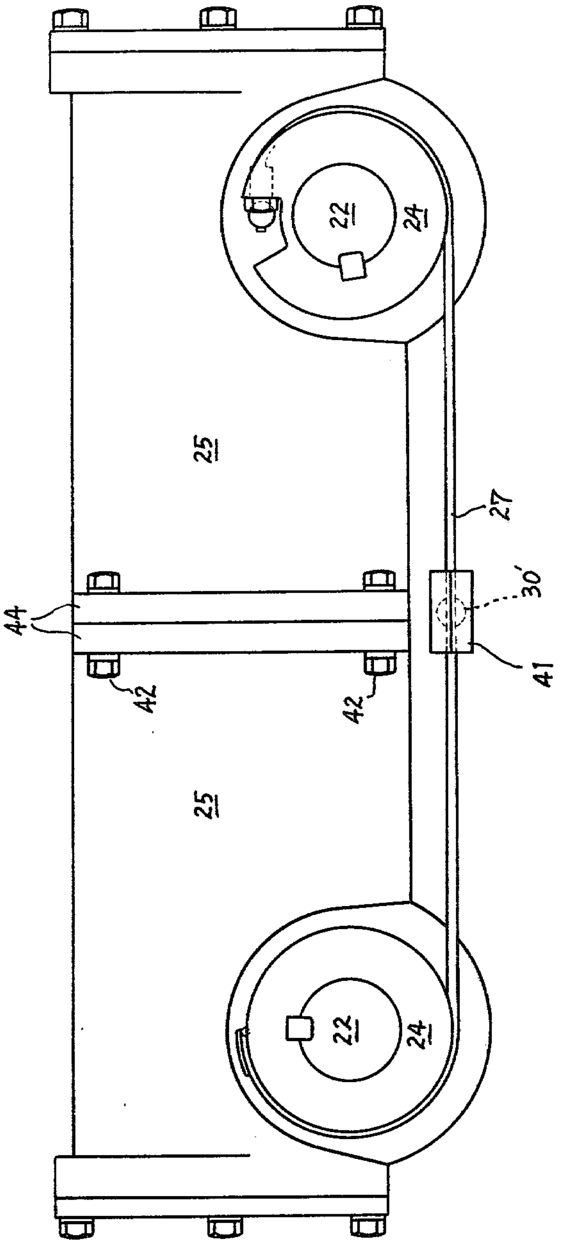
FIG. 2 is a side elevation showing the outer contour and the shut-out power transmission element of the embodiment shown in FIG. 1.

As shown in FIG. 2, a pair of outer pulley blocks 24, 24 are mounted on the paired output shafts 22, 22 at their exposed portions or extensions projecting through seal means out of the fluid-tightly closed housing 25. To said outer pulley blocks fixedly connected are outside wire ropes which constitute the shut-out power transmission element balancing or compensating the pulling force applied to the inside wire ropes 26. A linear motion power pick-up member 41 is fixedly secured to the ropes 27 through fixing metal beads 30'. Although the member 41 is positioned substantial center of the ropes 27 as shown, one or more of such members may be secured at any desired locations to serve as linear motion pick-up means to transmit linear motion power to an outer loading or to act as a piston position detector or a sequence control signal generator. In this embodiment, the member 41 moves in the direction reverse to the moving direction of the piston 21.

Figure 3:
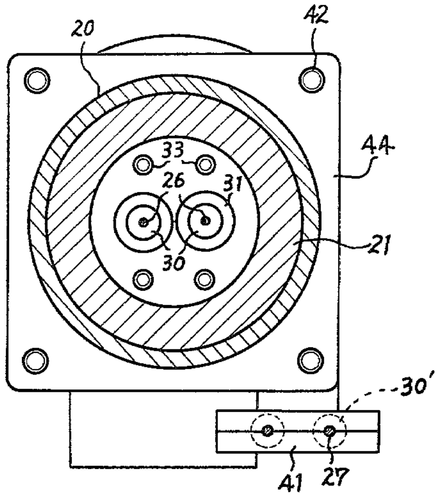
FIGS. 3 to 5 are, respectively, sections of the embodiment shown in FIG. 1 taken along lines III—III, IV—IV and V—V in FIG. 1.
Figure 4:
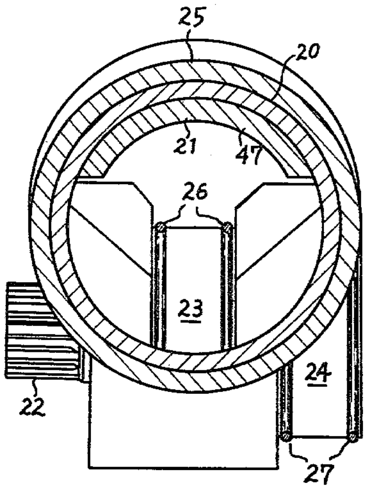
Figure 5:
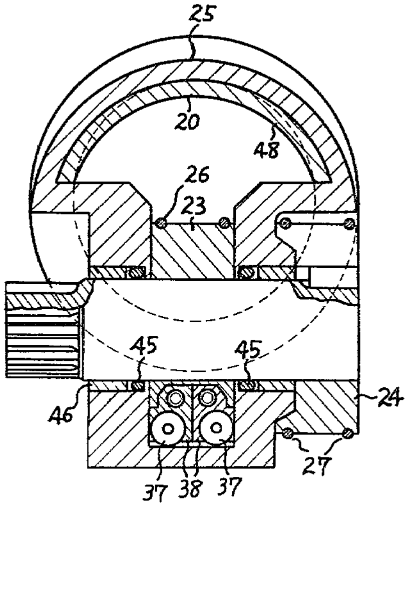

Referring now to FIGS. 3 to 5, inside and outside ropes 26 and 27 are respectively composed of generally parallel wire ropes to solidify or strengthen the structure. It should be apparent to those skilled in the art that provision of a single element for each of the shut-in and shut-out power transmission elements suffices to attain the object of the invention provided that such single element is satisfactorily strong and durable to effect reliable operation. Anyway, in this embodiment, paired inside wire ropes 26 extend through the piston 21, preferably being applied with sealant means such as nylon coating. As shown in FIG. 4, the inside ropes 26 extend in a plane above the horizontal plane containing the central axes of the output shafts 22, whereas the outside ropes 27 extend in the plane below the horizontal plane containing the central axes of the output shafts 22. In this Figure, the section of the overhanging crescent portion 47 of the piston 21 locating in the upper portion in the cylinder 20 is also shown.

FIG. 5 shows the axial sealing structure between the output shaft 22 and a bearing system carrying the same. The chamber enclosed by the housing 25 is fluid-tightly separated from the environment by O-rings 45, 45 which are well-known simple and reliable sealing means. Reference numeral 46 designates a bushing. In FIG. 5, an end extension 48 for slidably engaging with the overhanging crescent portion 47 is shown. Such end extensions are provided at the upper portions of both ends of the cylinder 20 for accommodating the overhanging crescent portions symmetrically provided beyond both of the piston faces when the piston 21 is moved to the leftmost and rightmost positions. The smaller diameter broken line in FIG. 5 denotes the inner periphery of the housing 25.

Figures 6, 7:
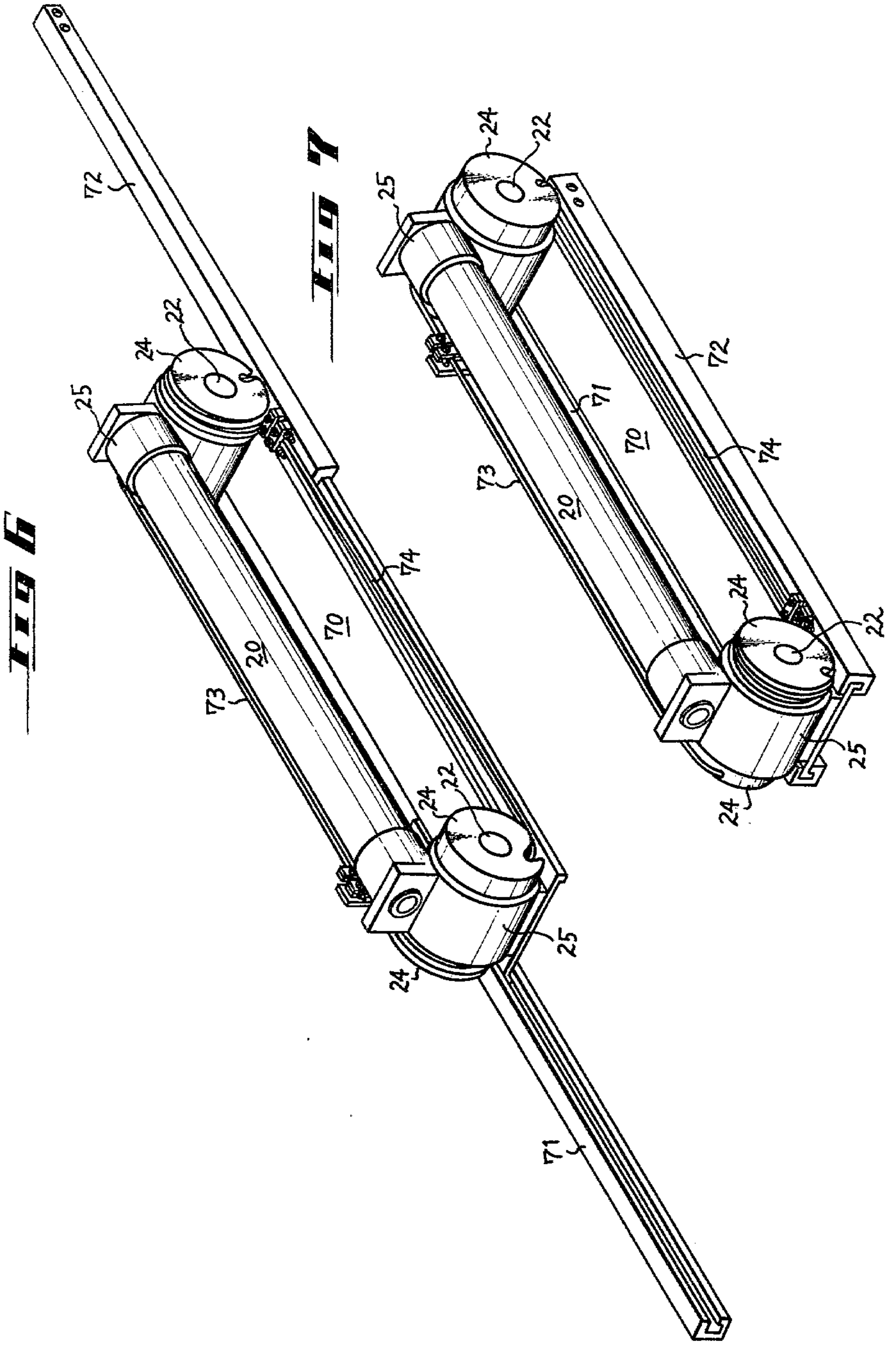
FIGS. 6 and 7 are perspective views of another embodiment of the invention suited for use as an actuator having a working distance twice as the stroke length of the piston, and show respectively the extended position and the extracted position.
Figure 6:
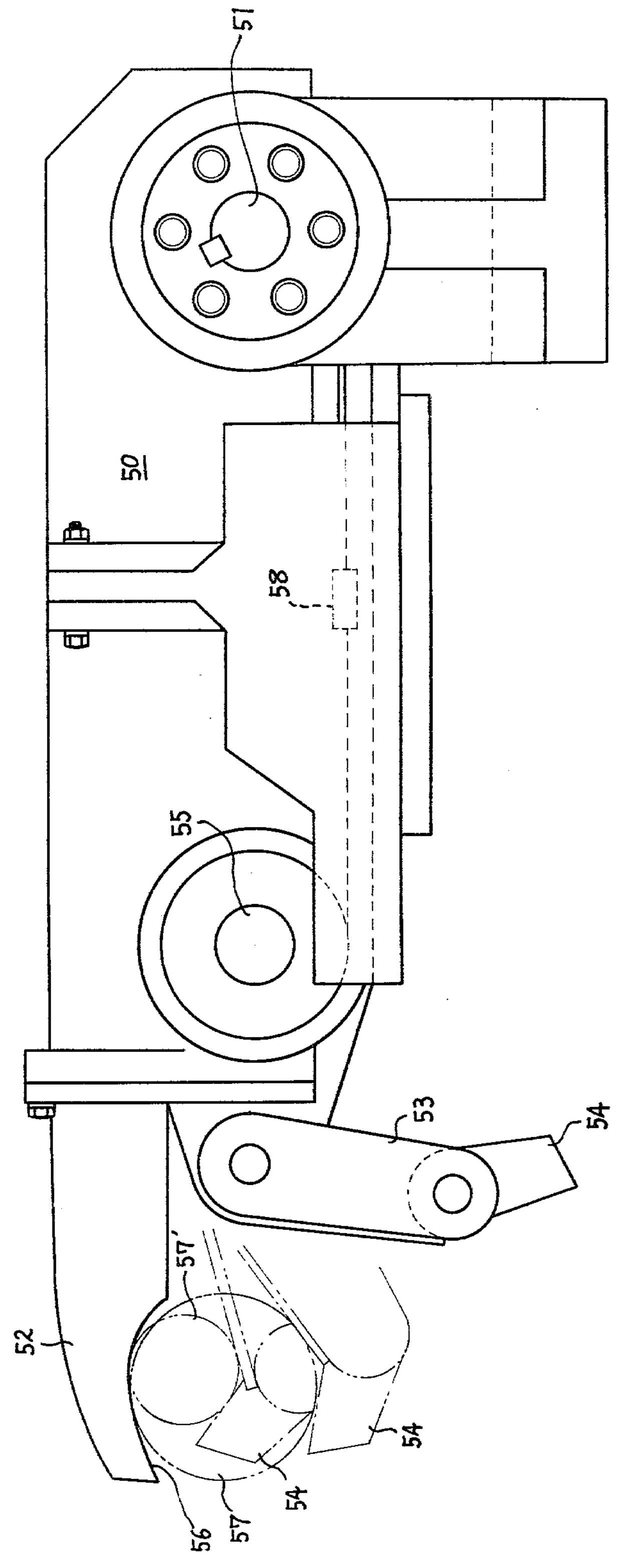

Another embodiment shown in FIGS. 6 and 7 is an actuator having the working distance twice as the stroke length of the piston thereof. The principal construction of this embodiment is similar as that of the first embodiment, and the parts effecting the same functions are given with the same reference numerals. However, this embodiment is patentably distinctive from the first embodiment in that two pairs of outside wire ropes are provided, the first pair of ropes 73 moving in the same direction while the second pair of ropes 74 moving in the reverse direction relative to the piston (not shown) slidably received in a cylinder 20. Further, a rectangular base plate 70 is disposed beneath and secured to a pair of housings 25, and a pair of sliding members 71 and 72 are secured, respectively, to the first and second pairs of ropes 73 and 74 to be guided by the edges of the base plate 70. As will be clear by comparing the extended and retracted positions respectively shown in FIGS. 6 and 7, the relative linear motion distance between the members 71 and 72 is doubled as the moving distance of the piston.

As will be readily understood from the foregoing descriptions, the present invention provides a reliable multiple function actuator which is simple and compact in construction and durably used for long period of time without caused by appreciable leakage of the high pressure driving fluid while being avoided from disadvantageous pressure loss due to friction otherwise induced by a complex sealing means in the prior art devices. Particularly, according to the present invention in which the fluid-tight chamber is sealingly separated from the environment by means of a simple axial seal, a rotary actuator sustainable to such a high pressure hydraulic power as 200 kg/cm$^2$ can be produced. Moreover, rotary actuating powers and one or more linear motion actuating powers may be picked up simultaneously from a small-sized actuator. These advantageous features of the invention will be further described with reference to some appliances in order to facilitate to fully understand the merits of the invention.

FIG. 8 shows an industrial robot used for presenting and removing a workpiece to and from a machine tool such as an automatically operated copying lathe, wherein an actuator principally similar as the one as illustrated in FIGS. 1 to 5 is incorporated. As shown in FIG. 8, a rocking arm 50, which is actuated by a first output shaft 51 for swinging about that shaft, has a hand mechanism comprising a fixed pawl 52 fixedly connected relative to the fore end of the arm 50 and an articulated finger 53 bearing at its end a movable pawl 54 and actuated by a second output shaft 55. The inner face 56 of the pawl is articulated and the finger 53 constitutes a link mechanism in combination with the movable pawl 54 and a not-shown differential gearing, so that a generally cylindrical workpiece 57 or 57' different in diameter may be snugly grasped by the pawls 52 and 54 and the finger 53. The second output shaft 55 controls the opening and closing operation of the link mechanism including the finger 53 and the movable pawl 54. The output shafts 50 and 55 are selectively put on and off through an appropriate clutch (not shown) which serves to teach-in the position of the finger 52 displaced by the swinging movement of the arm 53, whereby the workpiece 57 or 57' is taken up, moved to be presented to a machine tool, removed from the machine tool after the completion of the machining step, moved to a finished product collecting station and finally taken off from the robot. The teach-in and read-out operations for indicating and determining the position of the finger 52 are effected by a linear motion pick-up member 58 carrying a read-out device (not shown) combined with a plurality of adjustable position indicating members (not shown) secured to the arm 50 in a very simple and yet reliable manner. In FIG. 8, the dots-and dash lines show sectional contours of larger and smaller diameter workpieces grasped by the hand mechanism at three contact points on the arcuated inner face 56 of the fixed pawl 52, the inner face of the finger 53 and the inner face of the movable pawl 54.

The second application example relates to an actuator for automatically operating valves of the piping in a plant. In this example, the feature of the actuator according to the present invention having two rotary output shafts and one linear motion pick-up member utilizable for control means is ingeniously made the best use thereof, whereby two adjacently disposed valves are opened and closed in optional modes.

Figure 9:
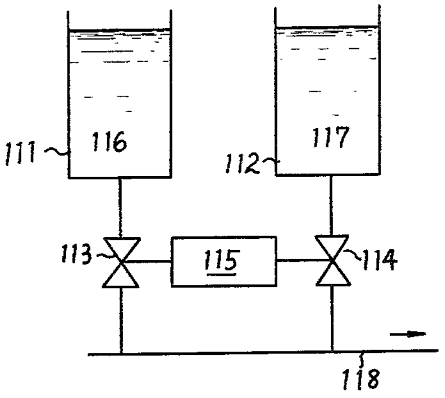
FIG. 9 is a schematic respresentation showing a piping arrangement wherein an embodiment of the present invention is used as the control means.

Referring to FIG. 9 showing an exemplified piping arrangement in a plant, first and second tanks 111 and 112 contain respectively first and second liquids 116 and 117 which are selectively fed through first and second valves 113 and 114 to a main line 118. An actuator according to the invention is installed inbetween the first and second valves 113 and 114 and its two output shafts are connected these valves correspondingly. In the prior art, two actuators are necessary which are mounted separately to these valves.

Figure 10:
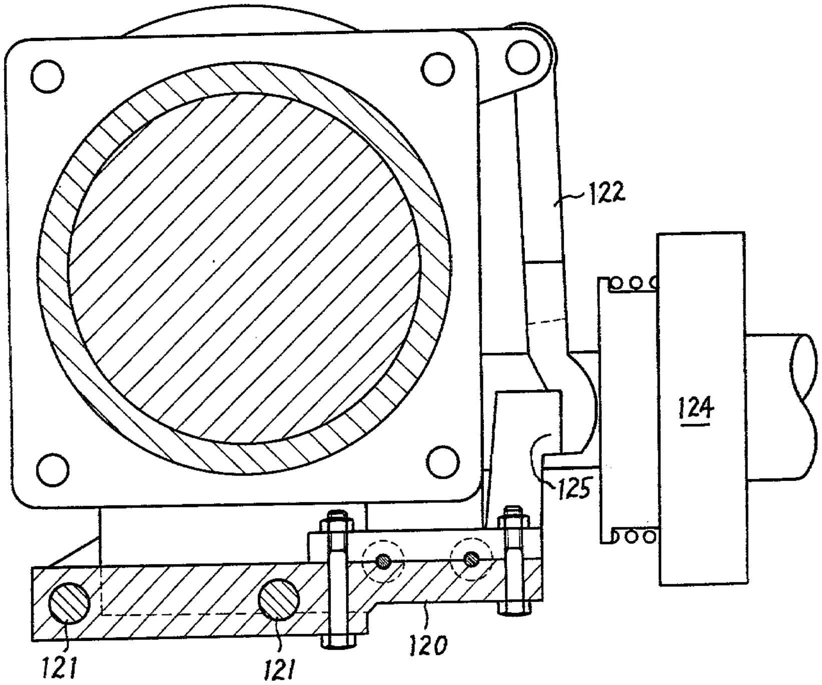
FIG. 10 is a view, partly in section, of the control means of FIG. 9 wherein an actuator according to the invention is incorporated.

FIG. 10 show a section of the actuator 115 having a linear motion power pick-up member 120 guided by guide bars 121, 121 to be able to move stably along a linear line. A cam plate 125 is secured to the member 120 to abut against the clutch control lever 122 to actuate the same in response to the linear movement of the member 120. A clutch 124 is operatively connected with a valve and actuated by the clutch control lever 122 to rotate the valve. Using such actuator 115 according to the invention wherein the information for instructing to open and close the pair of valves is included in the position per se of the cam plate 125, it is possible to control the operation mechanically in the most simple and reliable manner that the cam plate 125 actuates the pair of clutch control levers 122 in response to the reciprocal movement of the piston of a piston-cylinder unit to open the one valve after the other valve is completely closed.

Figure 11:
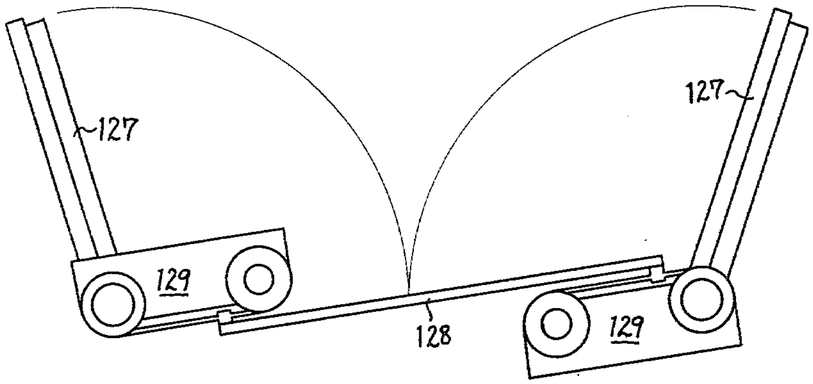
FIG. 11 is a schematic view showing a system for automatically opening and closing watertight doors of a ship in synchronism with one another, wherein two actuators according to the invention are combined.

In the third example, two actuators according to the invention is combined in a really simple manner to operate in synchronism with each other. FIG. 11 shows schematically the mode of operation of a combined actuating system for automatically opening and closing a watertight door of ship. In order to open and close a double-leafed hinged door 127 while retaining its watertight characteristic, two actuators 129 shall be operated in synchronism with each other. Using the actuators according to the invention, synchronized operations may be realized only by connecting the linear motion pick-up members of both of the actuators 129 through a non-extensible and non-compressible bar 128. When comparing the construction shown in FIG. 11 to the conventional control means wherein two hydraulically driven actuators of the prior art are combined using a complex and expensive control mechanism, it should be readily appreciated that a simple and yet reliable synchronized operation may be realized by the use of the actuators of the invention.

While a few examples wherein the actuators of the invention are incorporated as actuators or control means have been described hereinabove, those skilled in the art will recognize that various other applications may be made from the teachings herein.

Figure 12:
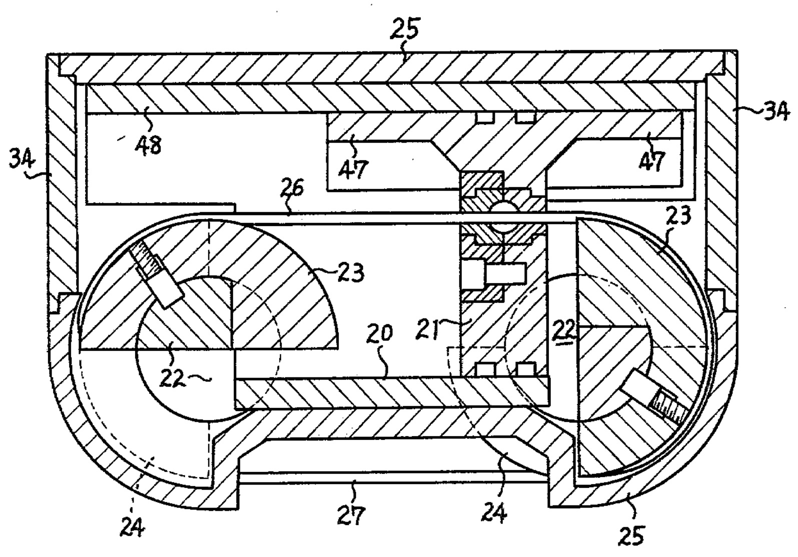
FIG. 12 is a sectional view showing a further modified embodiment of the invention having two output shafts closely arranged to be operated with the rocking angle of 90°.

It is also apparent that many modifications and variations may be made without departing the spirit of the present invention as defined in the claims, one such modification is shown in FIG. 12 which has two swingable output shafts 22 closely arranged with the swinging angle of 90° and from which a linear motion actuating power may be picked up through the shut-out power transmission element 27 thereof. In this modification, pulley means 23 mounted on the output shafts 22 are generally semi-circular in cross-section and the quadrant in cross-section parts thereof can be gotten into the zone through which the piston 21 moved reciprocally, so that the dimensions of the actuator may be greatly decreased.

What is claimed is:

1. An actuator comprising in combination:

a piston-cylinder unit;

a pair of substantially parallel output shafts having axes substantially perpendicular to the central axis of the cylinder of said piston-cylinder unit and respectively including confined portions sealingly enclosed in the fluid-tight chamber defined by said cylinder and exposed portions projecting via seal means out of said fluid-tight chamber;

a substantially non-extensible and substantially flexible shut-in power transmission element fixedly connected to the piston of said piston-cylinder unit at the substantial center thereof and having ends fixedly connected relative to said confined portion of said pair of substantially parallel output shafts; and a shut-out power transmission element having ends fixedly connected relative to said exposed portions of said pair of substantially parallel output shafts;

said shut-in and shut-out power transmission elements in combination with said pair of output shafts being operatively associated such that they constitute a complete pulley system to be driven responsive to the reciprocal movement of said piston thereby to transmit linear motion and rotational actuating power concurrently.

2. An actuator comprising in combination:

a cylinder defining a fluid-tight chamber and having a central axis and fluid inlet and outlet ports;

a piston sealingly received in said cylinder for reciprocal movement along said central axis of said cylinder;

a pair of substantially parallel output shafts having axes substantially perpendicular to said central axis of said cylinder and respectively including confined portions sealingly enclosed in said fluid-tight chamber and exposed portions projecting via seal means out of said fluid-tight chamber;

a substantially non-extensible and substantially flexible shut-in power transmission element fixedly connected to said piston at the substantial center thereof and having ends fixedly connected relative to said confined portions of said pair of substantially parallel output shafts; and a shut-out power transmission element having ends fixedly connected relative to said exposed portions of said pair of substantially parallel output shafts;

said substantially non-extensible and substantially flexible shut-in power transmission element and said shut-out power transmission element being operatively associated with one another such that they constitute in combination complete pulley belt means just as an integral pulley belt as stretched over said pair of output shafts to be driven responsive to said reciprocal movement of said piston thereby to actuate said pair of output shafts.

3. An actuator comprising in combination:

a cylinder defining a fluid-tight chamber and having a central axis and fluid inlet and outlet ports;

a piston sealingly received in said cylinder for reciprocal movement along said central axis of said cylinder;

a pair of substantially parallel output shafts having axes substantially perpendicular to said central axis of said cylinder and respectively including confined portions sealingly enclosed in said fluid-tight chamber and exposed portions projecting via seal means out of fluid-tight chamber;

a substantially non-extensible and substantially flexible shut-in power transmission element fixedly connected to said piston at the substantial center thereof and having ends fixedly connected relative to said confined portions of said pair of substantially parallel output shafts; and a shut-out power transmission element having ends fixedly connected relative to said exposed portions of said pair of substantially parallel output shafts;

said shut-out power transmission element is operatively associated with said pair of output shafts and said shut-in power transmission element such that it compensates and transmits the pulling force existing in said shut-in power transmission element to complement a complete pulley system in combination with said pair of output shafts thereby to form a linear motion actuating element driven in response to said reciprocal movement of said piston.

4. An actuator according to claim 1, 2 or 3, wherein said shut-out power transmission element is made of a substantially non-extensible and substantially flexible material.

5. An actuator according to claim 4, wherein said shut-in and shut-out power transmission element are made of the same material.

6. An actuator according to claim 4, wherein said shut-in and shut-out power transmission elements are made of a material selected from the group consisting of a wire rope and a pulley belt to be wound around a take-up drum, a chain and a timing belt to be meshed with a sprocket and a leaf chain in combination with pulley means.

7. An actuator according to claim 1, 2 or 3, wherein said shut-out power transmission element is made of a rack meshing with a pinion which is mounted on each of said output shafts.

8. An actuator according to claim 1, 2 or 3, further comprising an additional shut-out power transmission element is mounted on said pair of output shafts.

9. An actuator according to claim 8, wherein the two shut-out power transmission elements are mounted on said pair of output shafts such that one of them is moved in the same direction as said piston whereas the other of them is moved in the reverse direction.

10. An actuator according to claim 1, 2 or 3, wherein one or more of said pair of output shafts and said shut-out power transmission element is connected to clutch or brake means selectively connecting the actuating powers to the outer means.

11. An actuator according to claim 10, wherein the two selected from the group consisting of said pair of output shafts and said shut-out power transmission element is connected to clutch or brake means, and wherein the residual one is provided with a control means for selectively connecting and disconnecting said clutch or brake means.

* * * * *